United States Patent
Abdi Taghi Abad et al.

(10) Patent No.: US 10,769,618 B2
(45) Date of Patent: Sep. 8, 2020

(54) SYSTEMS AND METHODS FOR TEMPORARILY ACTIVATING A PAYMENT ACCOUNT FOR FRAUD PREVENTION

(71) Applicant: Capital One Services, LLC, McLean, VA (US)

(72) Inventors: Fardin Abdi Taghi Abad, Champaign, IL (US); Jeremy Goodsitt, Champaign, IL (US); Austin Walters, Savoy (IL)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/032,064

(22) Filed: Jul. 10, 2018

(65) Prior Publication Data

US 2020/0019966 A1    Jan. 16, 2020

(51) Int. Cl.
| | |
|---|---|
| *G06Q 20/34* | (2012.01) |
| *G06Q 20/40* | (2012.01) |
| *G06Q 20/20* | (2012.01) |
| *G06Q 20/38* | (2012.01) |

(52) U.S. Cl.
CPC ......... *G06Q 20/354* (2013.01); *G06Q 20/202* (2013.01); *G06Q 20/3827* (2013.01); *G06Q 20/405* (2013.01); *G06Q 20/4012* (2013.01); *G06Q 20/4016* (2013.01)

(58) Field of Classification Search
CPC . G06Q 20/4016; G06Q 20/354; G06Q 20/405
See application file for complete search history.

(56) References Cited

U.S. PATENT DOCUMENTS

| | | | |
|---|---|---|---|
| 5,945,653 A * | 8/1999 | Walker | G06Q 20/341 235/375 |
| 8,073,774 B2 | 12/2011 | Pousti | |
| 2004/0024638 A1 | 2/2004 | Restis | |
| 2004/0078325 A1* | 4/2004 | O'Connor | G06Q 20/04 705/39 |

(Continued)

FOREIGN PATENT DOCUMENTS

WO    WO-2007027791 A2 *    3/2007    ........... G06Q 20/354

OTHER PUBLICATIONS

"How to temporarily lock your credit card", MoneyTips Staff, MoneyTips, Oct. 10, 2017. (Year: 2017).*

*Primary Examiner* — Eric T Wong
(74) *Attorney, Agent, or Firm* — Pillsbury Winthrop Shaw Pittman LLP

(57) ABSTRACT

A system for temporarily enabling an otherwise disabled payment account for use in a transaction is configured to perform operations including receiving, from a point of sale device, a transaction request associated with an account of a user, the transaction request comprising a transaction value representing a currency amount. The operations may also include determining that the user account has a disabled status. Further, the operations may include converting the transaction request into a personal identification code based at least in part on the transaction value. The operations may additionally include determining that the personal identification code matches a stored authorization code associated with the user account. And, the operations may include modifying the disabled status to permit successful processing of at least one subsequent transaction request associated with the user account.

19 Claims, 7 Drawing Sheets

(56) References Cited

U.S. PATENT DOCUMENTS

| | | | | |
|---|---|---|---|---|
| 2004/0230536 A1* | 11/2004 | Fung | .................... | G06Q 20/382 |
| | | | | 705/64 |
| 2005/0080728 A1* | 4/2005 | Sobek | ................... | G06Q 20/04 |
| | | | | 705/39 |
| 2005/0273431 A1* | 12/2005 | Abel | ...................... | G06Q 20/02 |
| | | | | 705/42 |
| 2006/0006223 A1* | 1/2006 | Harris | ................... | G06Q 20/10 |
| | | | | 235/379 |
| 2006/0278697 A1* | 12/2006 | Lovett | ................... | G06Q 20/24 |
| | | | | 235/380 |
| 2012/0191615 A1 | 7/2012 | Schibuk | | |
| 2012/0221422 A1* | 8/2012 | Sobek | ................... | G06Q 20/20 |
| | | | | 705/17 |
| 2012/0296818 A1* | 11/2012 | Nuzzi | ................ | G06Q 20/3224 |
| | | | | 705/41 |
| 2013/0013513 A1* | 1/2013 | Ledbetter | ............... | G06Q 20/12 |
| | | | | 705/44 |
| 2013/0185132 A1* | 7/2013 | Hogg | ..................... | G06Q 20/04 |
| | | | | 705/14.27 |
| 2014/0344154 A1* | 11/2014 | Flurscheim | ............ | G06Q 20/10 |
| | | | | 705/44 |
| 2014/0379504 A1* | 12/2014 | George | ............. | G06Q 20/4016 |
| | | | | 705/21 |
| 2015/0106274 A1 | 4/2015 | Rodriguez et al. | | |
| 2015/0193773 A1* | 7/2015 | Mattioli | ............. | G06Q 20/4016 |
| | | | | 705/18 |
| 2015/0278811 A1* | 10/2015 | Lalchandani | .......... | G06Q 20/40 |
| | | | | 705/42 |
| 2016/0292686 A1* | 10/2016 | Laxminarayanan | ......................... | |
| | | | | G06Q 20/4014 |

* cited by examiner

SYSTEMS AND METHODS FOR TEMPORARILY ACTIVATING A PAYMENT ACCOUNT FOR FRAUD PREVENTION

TECHNICAL FIELD

The disclosed embodiments generally relate to systems and methods for implementing authorization rules for fraud prevention.

BACKGROUND

In current payment systems, once a customer's payment account (e.g., a credit or debit card) and/or payment method associated with the account becomes associated with fraudulent behavior, the payment account and/or payment method generally are deactivated immediately to prevent further fraudulent use of the account. Specifically, financial account providers typically deactivate the account and/or the payment method immediately, and arrange for a new account and/or payment method to be set up and provided to the customer. For example, once a credit card number or account is associated with fraudulent behavior, the credit card and account number will no longer be usable by the customer, even when the customer remains in physical possession of the credit card itself. In some situations, it may take several days and up to more than one week for the customer to receive a replacement card and account number. During this time, a customer may be significantly inconvenienced by the inability to use the account for entering into a transaction.

Thus, there is a need for systems and methods capable of enabling legitimate continued use of a compromised payment account and/or payment method to conduct transactions while reducing the potential of fraudulent use.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments include a system for temporarily enabling an otherwise disabled payment account for use in a transaction. The system includes one or more memory devices storing instructions, and one or more processors configured to execute the instructions to perform operations including receiving, from a point of sale device, a transaction request associated with an account of a user, the transaction request comprising a transaction value representing a currency amount. The operations may also include determining that the user account has a disabled status. Further, the operations may include converting the transaction request into a personal identification code based at least in part on the transaction value. The operations may additionally include determining that the personal identification code matches a stored authorization code associated with the user account. And, the operations may include modifying the disabled status to permit successful processing of at least one subsequent transaction request associated with the user account.

The disclosed embodiments include a computer-implemented method for temporarily enabling an otherwise disabled payment account for use in a transaction. The method may include receiving, from a point of sale device, a transaction request associated with an account of a user, the transaction request comprising a transaction value representing a currency amount. The method may include determining that the user account has a disabled status. Further, the method may include determining that the transaction value matches a stored authorization code associated with the user account. Additionally, the method may include modifying the disabled status to permit successful processing of at least one subsequent transaction request associated with the user account.

The disclosed embodiments include a system for temporarily enabling an otherwise disabled payment account for use in a transaction. The system includes one or more memory devices storing instructions, and one or more processors configured to execute the instructions to perform operations including receiving, from a first point of sale device, a first transaction request associated with an account of a user, the first transaction request comprising a first transaction value representing a currency amount. The operations may also include determining that the user account is disabled. The operations may further include determining that the first transaction value corresponds to an authorization code for the user account. Additionally, the operations may include receiving, from one of the first point of sale device or a second point of sale device, a second transaction request associated with the user account, the second transaction request comprising a second transaction value representing a currency amount. Also, the operations may include determining that the second transaction value corresponds to a service request code that represents a service request for the user account. The operations may further include implementing the service request for the user account.

In accordance with additional embodiments of the present disclosure, a computer-implemented methods and computer-readable mediums are disclosed to implement one or more methods. For example, the computer-readable mediums may store instructions that, when executed by a processor(s), cause the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
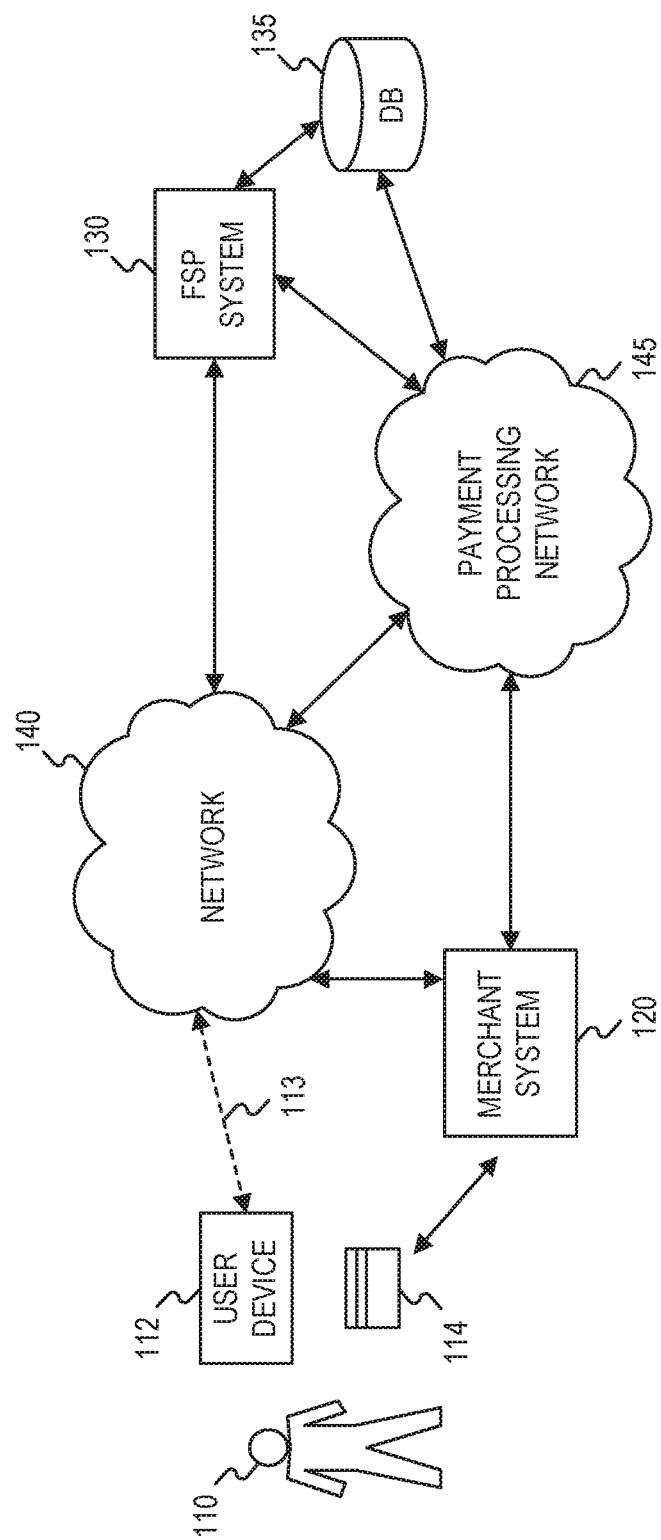
FIG. 1 is a block diagram of an exemplary system, consistent with the disclosed embodiments.

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure provides systems and methods for enabling continued use, on a restricted basis, of a payment method or account for which a financial service provider has identified fraudulent activity or potentially fraudulent activity or has otherwise declared unusable. Continued use of the payment method or account may be limited by a location-based and/or time-based transaction rule. A user in possession of a payment card (or other payment method) may continue to use the payment method upon an additional verification step that includes the user initiating a transaction using an authorization request code. The user may verify his identity and request to implement a location-based or time-based transaction rule based on, for example, a purchase request for a currency amount that corresponds to an authorization request code. This authorization request code may allow the user to implement temporary transaction rules with only using point of sale (POS) systems. That is, disclosed embodiments may be implemented to implement temporary transaction rules without the need to use a telephone or mobile device (e.g., to authorize transaction rules through a telephone conversation or mobile application). The user may actively request, using a purchase request at a POS system for a particular amount of currency, for example, that the payment method and/or account be "activated" for use in a subsequent transaction. A financial service provider or other payment processing entity may then "activate" the payment method or account (e.g., for a limited window of time and/or a specific geographic area). Additional aspects of the disclosed embodiments are set forth below in this disclosure.

The present disclosure describes an advantageous, rule-based transaction authorization system and method for enabling continued, temporary, and/or restricted use of a payment method and/or account for a transaction in which a payment method or account may have been otherwise declared unusable. In some embodiments, a location-based rule may be associated with the payment method to enable continued use of the payment method after a user attempts a transaction at a POS system for a currency amount corresponding to a personal identifier. Additionally or alternatively, a time-based rule may be associated with the payment method, enabling continued use of the payment method upon satisfying a timing condition. According to some embodiments, a location-based rule may be established and verified based on a user providing a specific personal identifier corresponding to a particular geographic region. Embodiments may determine whether a subsequent transaction request originates from a location within the geographic region, for example, using a merchant identifier in the transaction request.

A common trigger for preventing use of a payment method or an account includes the detection of fraudulent (or potentially fraudulent) behavior using the payment method or account. For many financial service providers, an account and/or payment method may be declared inactive upon detection of fraudulent behavior, thus preventing the use of the account or payment method for entering a transaction. In many cases, a customer or owner of the account may maintain physical possession of the payment method (e.g., a payment card, credit card, debit card, etc.). The customer would otherwise be able to enter into a transaction using the payment method but for the financial service provider declaring the account unusable. The disclosed embodiments enable customers, such as those in possession of the payment method, to continue use of the payment method for a transaction upon satisfying additional rules for the transaction.

Some systems may use additional rules that involve a user's mobile device. For example, systems may implement rules, such as using the location of a user mobile device, requesting user feedback in an application running on a mobile device, and/or calling a user to have a discussion regarding the user's account. However, these type of rules may require a user to have access to a telephone, mobile device, or computer. And, it may further require those devices to have a network connection (e.g., public standard telephone network (PSTN) connection to receive a phone call, a GPS signal to determine the location of a user device, a cellular or Wi-Fi-based network connection to allow the mobile device to report the GPS location or connect the mobile device authentication application to the Internet). Therefore, transaction rules based on these types of devices and network connection may not work when a device is not usable or a network connection is not available. For example, a user may be in a foreign country and be without cellular connectivity for a call or network connection. In another example, a user's phone or mobile device may have lost power, become unusable (e.g., broken, corrupted), or be stolen. Disclosed embodiments may allow a user to authorize transactions on an otherwise unusable account without the need for such devices or connections. Instead, disclosed embodiments may make use of existing point of sale (POS) systems to transmit an authorization request code. For example, disclosed embodiments may transmit an authorization request code in the transaction amount field of a transaction request. Therefore, the user may be able to provide authorization for an account using any of the widely available POS systems, which would likely be present when the user is trying to make a charge on the unusable account.

Upon receiving the transaction request, a financial service provider or other associated payment processor may determine that the account has POS-authorization enable and, therefore, associate a rule with the payment method and/or account based on the currency amount of the transaction request. The rule may be associated with the account for a predefined period of time sufficient to enable a customer to enter into a subsequent, "real" transaction. The customer may then enter into a transaction using the payment method previously declared unusable. In some embodiments, the payment method and/or account may return to its previous restricted state regardless of whether time remains within the predefined period of time indicated in the rule that became associated with the payment method and/or account based on the request.

During a pre-authorization process for a transaction initiated with the payment method, a financial service provider or associated payment processor may determine whether to authorize the transaction based on the transaction authorization code transmitted as the currency amount of the transaction. Upon determining a match in the currency amount with a predetermined user authorization code, the financial service provider or payment processor may authorize the transaction. Following authorization, the payment method may once again return to its prior restricted state.

Thus, the disclosed systems and methods overcome problems known to traditional systems in the transaction technology fields. For example, in many situations, users that remain in possession of a payment card or other payment method may be significantly inconvenienced by the inability to continue use of the payment method once a financial service provider has decided to "deactivate" the payment method or otherwise declare the payment method unusable. Some users may not possess another payment card, and in an emergency situation may be unable to initiate a necessary transaction. And, in such situations, users may also not have access to one or more of a telephone, mobile device, or network connection. Despite a history of, or potential for, fraudulent activity using a payment method, the disclosed systems and methods enable continued, restricted, and/or limited use of the payment method based on additional authentication measures. The additional authentication measures include a transaction authorization code transmitted as the currency amount in a transaction amount field of a transaction request. Additionally, in some embodiments, a payment method may be "activated" for a particular transaction or set of transactions for a limited duration of time in which a user may initiate a transaction using the payment method. It is unlikely that a fraudster may coincidentally also attempt to use the payment account for a transaction during the limited window of time, much less according to conditions (e.g., location restrictions) set in other additional authentication methods disclosed herein.

The following disclosure provides exemplary systems and methods for enabling continued, temporary, and/or restricted use of a payment method that may otherwise have been declared unusable, thus realizing the above advantages and benefits over conventional systems.

FIG. 1 shows a diagram of an exemplary system 100 configured to enable continued use of a payment method otherwise declared unusable, consistent with disclosed embodiments.

As shown in FIG. 1, system 100 may include a user device 112 and a payment card 114 associated with a user 110. System 100 may also include a merchant system 120 with which user 110 may enter into a transaction using payment card 114. Merchant system 120 may communicate with a financial service provider (FSP) system 130 via a payment processing network 145 to authorize the transaction. System 100 may also include a database 135 accessible to FSP system 130 and/or payment processing network 145 to authorize or otherwise process the transaction, among other things. System 100 may also include a network 140 to facilitate communication among the components of system 100. Network 140 may also facilitate merchant system 120 to communicate with FSP system 130 to request and register one or more transaction rules to be associated with a user's 110 account with the financial service provider, consistent with the disclosed embodiments.

The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

System 100 may include one or more of user device 112 associated with one or more of user 110. User 110 may operate user device 112, which may be a desktop computer, laptop, tablet, smartphone, multifunctional watch, pair of multifunctional glasses, tracking device, or any suitable device with computing capability. User device may connect to network 140 using a network connection 113. Although shown in FIG. 1 in solid lines, user device 112 may not be a part of system 100 in some embodiments. For example, user 110 may only have payment card 114 when interacting with merchant system 120.

In some embodiments, user device 112 may be unusable. User device 112 may be unavailable, inoperable, or lack a network connection (e.g., as shown in FIG. 1 with network connection 113 being a dashed line to represent it not being consistently present). Example situations in which user device 112 is unavailable may include user device 112 not being present (e.g., lost or left at another location). Example situations in which user device 112 is inoperable may include when user device 112 is corrupted (e.g., "bricked," "frozen," infected with a computer virus, and the like) or lacks power (e.g., no battery power, low battery power, no power source, no charging cable, and the like). And, example situations in which user device 112 may lack a network connection may include when user device 112 is located in a foreign, "roaming" region outside its normal cellular network, when user device 112 does not receive a wireless signal with sufficient strength, or when a cellular provider has not authorized user device 112 to connect to its network (e.g., because of an unpaid account with a cellular provider causing it to deny a connection, because user device 112 is outside its home network, because a network antenna has catastrophic failure, because a network access point does not have sufficient bandwidth, and the like).

Payment card 114 may include a physical card or other payment device, typically issued by a financial service provider and associated with a customer or client account. Payment card 114 may also be configured as a dongle, a fob, an e-wallet or any electronic device enabling user 110 to enter into a transaction. In some embodiments, payment card 114 may be presented at a merchant or merchant system 120 to initiate a transaction. In the disclosed embodiments, payment card 114 and/or user device 112 may correspond to a payment method when used to enter into a transaction.

In accordance with disclosed embodiments, FSP system 130 may be a system associated with a financial service provider (not shown), such as a bank, a credit card company, a lender, brokerage firm, or any other type of financial service entity that generates, provides, manages, and maintains financial service accounts for one or more of user 110. FSP system 130 may include one or more computing systems that are configured to execute software instructions stored on one or more memory devices to perform one or more operations consistent with the disclosed embodiments. For example, FSP system 130 may include one or more memory device(s) storing data and software instructions and one or more processor(s) configured to use the data and execute the software instructions to perform server-based functions and operations known to those skilled in the art. FSP system 130 may include one or more computing components specifically programmed and combined or arranged to perform the disclosed methods.

In certain embodiments, FSP system 130 may be configured as a particular apparatus, system, and the like, based on the storage, execution, and/or implementation of the software instructions that perform one or more operations consistent with the disclosed embodiments. FSP system 130 may be standalone, or it may be part of a subsystem, which may be part of a larger system. For example, FSP system 130 may represent distributed servers that are remotely located and communicate over a public network (e.g., network 140) or a dedicated network, such as a LAN, for a financial service provider. An exemplary computing system consistent with FSP system 130 is discussed in additional detail with respect to FIG. 2, below.

FSP system 130 may include or may access one or more storage devices configured to store data and/or software instructions used by one or more processors of FSP system 130 to perform operations consistent with the disclosed embodiments. For example, FSP system 130 may include memory configured to store one or more software programs that perform several functions when executed by a processor, including functions specific to the disclosed methods. The disclosed embodiments are not limited to separate programs or computers configured to perform dedicated tasks. For example, FSP system 130 may include memory that stores a single program or multiple programs. Additionally, FSP system 130 may execute one or more programs located remotely from FSP system 130. For example, FSP system 130 may access one or more remote programs stored in memory included with a remote component (such as database 135) that, when executed, perform operations consistent with the disclosed embodiments.

In certain aspects, FSP system 130 and/or database 135 may include server software that generates, maintains, and provides services associated with processing financial transactions. In some embodiments, FSP system 130 may connect with separate server(s) or other computing devices associated with database 135 that generate, maintain, and provide services associated with financial data for a financial service provider associated with FSP system 130. For example, database 135 may include a number of storage and processing components and associated software for storing account information of customers or clients of a financial service provider for use in authorizing and processing a transaction. Database 135 may be associated with FSP system 130 and made accessible to payment processing network 145 for performing various transaction authorization and processing functionality. In some embodiments, database 135 may be provided as part of payment processing network 145.

System 100 may also include one or more of merchant system 120. Merchant system 120 may be a computing system that is associated with a merchant or other business entity that provides goods and/or services, such as a restaurant, retailer, grocery store, service provider (e.g., utilities, etc.), or any other type of entity that may engage in any financial transaction (e.g., charity, tax collector, etc.) or other commercial transaction with a consumer, including health care providers, education providers, etc. While system 100 is shown with one merchant system 120 for ease of discussion, the disclosed embodiments may also be implemented in system 100 including two or more merchant systems 120 associated with any number of underlying entities (commercial or otherwise). Further, merchant system 120 is not limited to conducting business in any particular industry or field.

Merchant system 120 may be associated with a merchant brick and mortar location(s) that user 110 may physically visit and purchase goods and services. Such physical locations may include computing devices that perform financial service transactions with consumers (e.g., POS terminal(s), kiosks, etc.). Merchant system 120 may also include one or more location sensing devices configured to sense the presence or location of a user based on signals received from user device 112 or payment card 114. Merchant system 120 may also include back and/or front-end computing components that store data and execute software instructions to perform operations consistent with the disclosed embodiments, such as computers that are operated by employees of the merchant (e.g., back office systems, etc.). Merchant system 120 may also be associated with a merchant that provides goods and/or services via known online or e-commerce types of solutions. For example, such a merchant may sell goods or otherwise accept payment via a website using known online or e-commerce solutions to market, sell, and process online transactions conducted via network 140, for example.

In one embodiment, merchant system 120 may include one or more servers or other types of computer devices. The merchant system server(s) may be one or more computing devices configured to execute software instructions stored in memory to perform one or more processes consistent with the disclosed embodiments. For example, merchant system 120 may include one or more memory device(s) storing data and software instructions, and one or more processor(s) configured to use the data and execute the software instructions to perform server-based functions and operations known to those skilled in the art.

Merchant system 120 may further include server(s) that are configured to execute stored software instructions to perform operations associated with a merchant, including one or more processes associated with pre-authorization and processing of purchase transactions, generating transaction data (e.g., merchant name and location identifiers), and generating product data (e.g., SKU data) relating to purchase transactions, etc. Merchant system 120 may include one or more servers that may include a general purpose computer, a mainframe computer, or any combination of these components. In certain embodiments, merchant system 120 (or a system including merchant system 120) may be configured as a particular apparatus, system, and the like based on the storage, execution, and/or implementation of the software instructions that perform one or more operations consistent with the disclosed embodiments. A merchant server may be standalone, or it may be part of a subsystem, which may be part of a larger system. For example, a merchant server may represent distributed servers that are remotely located and communicate over a public network (e.g., network 140) or a dedicated network, such as a LAN. An exemplary computing system consistent with merchant system 120 is discussed in additional detail with respect to FIG. 2.

In certain aspects, merchant system 120 may include one or more web servers that execute software that generates, maintains, and provides a web site(s) for a respective merchant that is accessible over network 140. In other aspects, merchant system 120 may connect separately to web server(s) or similar computing devices that generate, maintain, and provide a web site(s) for a merchant.

In certain embodiments, a merchant may operate computing components associated with merchant system 120 to perform one or more processes consistent with the disclosed embodiments. For example, merchant system 120 may be configured to execute software instructions to provide transaction data and/or product data and other data relating to purchase transactions to FSP system 130 over network 140 or payment processing network 145. Additionally, merchant system 120 may be configured to execute software instructions to perform pre-authorization and other transaction processing operations regarding a transaction entered into using a financial service account associated with FSP system 130. These processes may be performed using payment processing network 145 that may be in communication with FSP system 130 and database 135.

Payment processing network 145 may include any number of computing components, systems, and subsystems in communication with merchant system 120, FSP system 130, and database 135, either directly or via network 140, for processing a payment transaction. For conciseness, payment processing network 145 may include any configuration or combination of known payment processing networks and systems implemented for authorizing, clearing and settling a transaction. Payment processing network 145 may generally include the underlying systems for receiving a transaction authorization request from a merchant system 120, performing verification and fraud analysis on the payment method, communicating with FSP system 130 associated with the payment method, providing an authorization decision to merchant system 120, clearing an authorized transaction, and settling the transaction through the payment of funds or otherwise. In some embodiments, payment processing network 145 may include a number of systems not shown, such as a financial service provider system associated with merchant system 120, a third party payment processor system, a card network and processing system (e.g., such as Visa, MasterCard, etc.) and any other systems related to processing payment transactions. In some embodiments, aspects of payment processing network 145 may include aspects of network 140 for the communication of various transaction data or other communications between various systems of payment processing network 145.

Network 140 may comprise any type of computer networking arrangement used to exchange data. For example, network 140 may be the Internet, a private data network, a virtual private network using a public network, a Wi-Fi network, a LAN or WAN network, and/or other suitable connections that may enable information exchange among various components of system 100. Network 140 may also include a PSTN and/or a wireless cellular network. Network 140 may be a secured network or unsecured network. In some embodiments, although not shown in FIG. 1, one or more components of system 100 may communicate directly through a dedicated communication link(s), such as links between FSP system 130 and merchant system 120. In other embodiments, FSP system 130 and merchant system 120 may communicate without intermediary devices, but via network 140 (e.g., using a dedicated channel, virtual private network, tunnel, or the like).

Other components known to one of ordinary skill in the art may be included in system 100 to process, transmit, provide, and receive information consistent with the disclosed embodiments. In addition, although not shown in FIG. 1, components of system 100 may communicate with each other through direct communications, rather than through network 140. Direct communications may use any suitable technologies, including close range communication protocols, such as those employed under the name BLUETOOTH™ or BLUETOOTH LE™, and Wi-Fi, or any known near field communications (NFC) techniques, or other suitable communication methods that provide a medium for transmitting data between separate devices.

Figure 2:
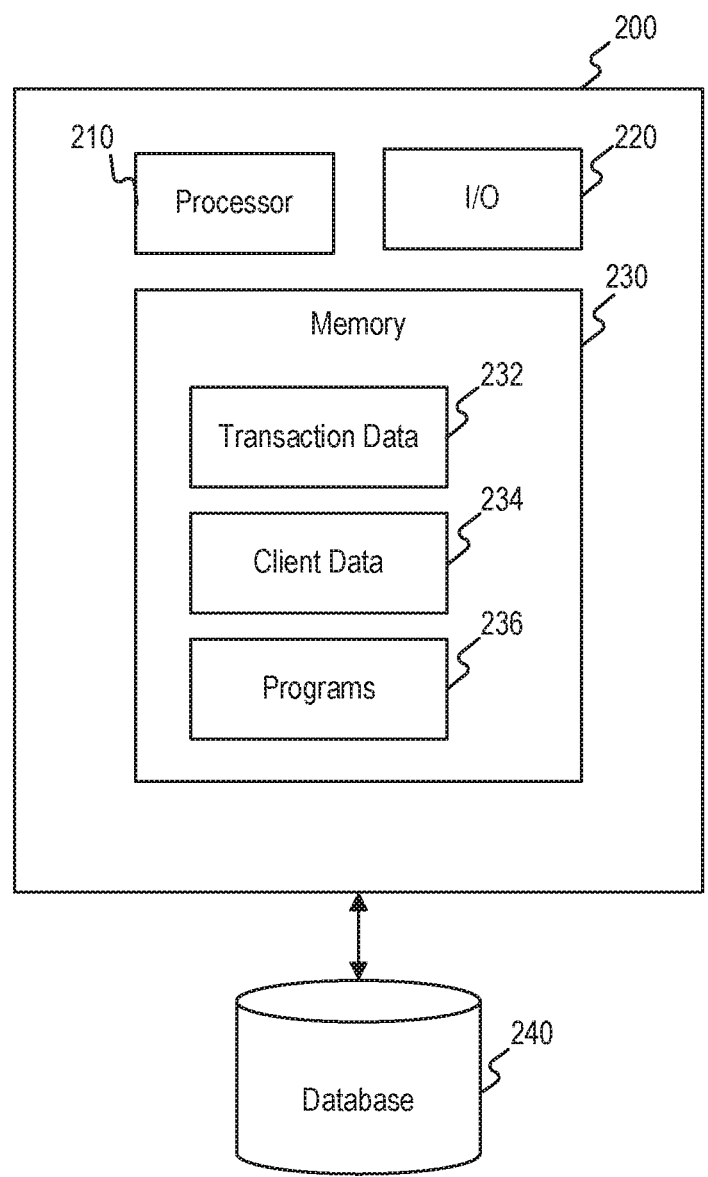
FIG. 2 is a block diagram of an exemplary computing system, consistent with the disclosed embodiments.

System 100 includes a number of components generally described as computing devices. Each of the computing devices may include any number of computing components particularly configured as a special purpose computing device to perform the functionality disclosed herein. FIG. 2 shows a diagram of an exemplary computing system 200 illustrating a computing system configuration that may be associated with FSP system 130, merchant system 120, one or more payment processing systems provided as part of payment processing network 145, and/or user device 112, consistent with the disclosed embodiments.

FIG. 2 is a block diagram of an exemplary computing system 200, consistent with the disclosed embodiments. In one embodiment, computing system 200 may include one or more of processor 210, one or more of memory 230, and one or more input/output (I/O) devices 220. In some embodiments, computing system 200 may take the form of a server, specially-programmed computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions executable by processor 210 to perform functions associated with the disclosed embodiments. For example, memory 230 may be configured with one or more software instructions, such as one or more program(s) 236 that perform particular functions when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, FSP system 130, merchant system 120, or user device 112, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, and generating and associating transaction rules to one or more accounts based on a location according to the disclosed embodiments.

Memory 230 may also store data that reflects any type of information in any format that the system may use to perform operations consistent with the disclosed embodiments. Memory 230 may store instructions to enable processor 210 to execute one or more applications, such as server applications, network communication processes, and any other type of application or software, including software directed to enabling a customer to complete a transaction using a payment method or account previously declared unusable according to the disclosed embodiments. Alternatively, the instructions, application programs, etc., may be stored in an external storage (such as database 240) in communication with computing system 200 via network 140 or any other suitable network. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

Memory 230 may include transaction data 232. Transaction data 232 may include information related to purchase or payment transactions initiated by user 110. For example, transaction data 232 may include a user identifier and a purchase price or payment amount and any other relevant transaction or merchant specific information including a location of the merchant and/or the location of the transaction. The user identifier may be a credit or debit card number, an account number, or another means for identifying the user initiating the purchase transaction. The purchase price may include a number representing the total sale price of the purchase transaction and/or may include a list of the various items purchased from the merchant or a category of items purchased. In other embodiments, a payment amount may include a sum of the transaction amount and other general information related to the payment including the name of the recipient, time and date of payment, and reason for payment etc.

In some embodiments, merchant system 120 may collect, generate, and provide transaction data relating to purchase transactions involving a user to FSP system 130 and/or other systems provided as part of payment processing network 145. In some embodiments, merchant system 120 may further provide additional information to FSP system 130 including product or service data (e.g., SKU data) and other data such as a geographical location of a merchant and/or the geographical location of the transaction and any other data relating to purchase transactions involving a user. Merchant system 120 may provide this information to FSP system 130 via payment processing network 145 or network 140. Alternatively, transaction data 232 may be stored in database 240, which may be an external storage device in communication with computing system 200 via network 140 or any other suitable network including payment processing network 145.

Memory 230 may further include client data 234, which may include information about particular clients of the financial service provider. For example, client data 234 may include client account information, debit or credit card information, history of purchase or payment transactions, financial statements, and one or more transaction rules and location information according to the disclosed embodiments. Client data 234 may include a data record associating a client account with one or more other accounts according to the one or more transaction rules. Client data 234 may further contain one or more user profiles corresponding to individual client accounts. In some embodiments, client data 234 may be stored in database 240, which may be an external storage device in communication with computing system 200 via network 140 or any other suitable network including payment processing network 145.

Processor 210, upon execution of one or more programs 236, may perform the functionality of the disclosed embodiments for enabling a user to continue temporary or restricted use of a payment method or account that has otherwise been declared unusable. In the disclosed embodiments, processor 210 may analyze received transaction data 232 in reference to one or more of the transaction rules and location information associated with client data 234 to perform the disclosed functionality.

For example, processor 210 may analyze transaction data 232 to determine which client with information stored in client data 234 is initiating the purchase transaction. Additionally, processor 210 may analyze transaction data 232 with respect to location information and the one or more transaction rules stored in association with client data 234 to determine whether the transaction may be authorized. In some embodiments, processor 210 may analyze a client request to enable use of a payment method for a future transaction, and associate one of the transaction rules with the client account stored in client data 234 to update the client account information accordingly. Processor 210 may also receive and/or determine location information corresponding to a location of user 110, and associate such information with the client account in client data 234. Processor 210 may also access data records stored as client data 234 to determine client account information, debit or credit card information, history of purchase transactions, financial statements and/or one or more transaction rules associated with an account. Other programmable functions of processor 210 are described in greater detail below.

I/O devices 220 may be one or more devices configured to allow data to be received and/or transmitted by computing system 200. I/O devices 220 may include one or more digital and/or analog communication devices that allow computing system 200 to communicate with other machines and devices, such as other components of system 100 shown in FIG. 1. Computing system 200 may also include interface components for one or more input devices, such as one or more keyboards, mouse devices, and the like, which may enable computing system 200 to receive input from an operator of FSP system 130 (not shown).

Computing system 200 may also contain one or more database(s) 240. Alternatively, computing system 200 may be communicatively connected to one or more database(s) 240. Computing system 200 may be communicatively connected to database(s) 240 through a direct connection and/or a network (e.g., network 140, payment processing network 145, etc.). Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

As discussed above, FSP system 130 may include at least one computing system 200. Further, although sometimes discussed here in relation to FSP system 130, it should be understood that variations of computing system 200 may be implemented in other components of system 100, including merchant system 120, and aspects of payment processing network 145. Computing system 200 may be a single server or may be configured as a distributed computer system including multiple servers or computers that interoperate to perform one or more of the processes and functionalities associated with the disclosed embodiments.

In some aspects, merchant system 120 may include the same or similar configuration and/or components of computing system 200. Computing system 200 when implemented in merchant system 120 may include any hardware and/or software installed therein necessary for performing methods and processes of the disclosed embodiments, such as for example, the processing of a payment transaction and receipt of location information.

Merchant system 120, implementing a computing system 200, may sell or otherwise accept payment for products and/or services via network 140. For example, user 110 may use a user device 112 to browse a webpage hosted or otherwise associated with merchant system 120 that runs on computing system 200, and may make a purchase of products or services offered by merchant system 120 via the webpage. In other embodiments, user 110 may initiate a purchase using payment card 114 (or user device 112) at a brick and mortar establishment associated with a merchant, and merchant system 120 (via, e.g., computing system 200, which may be a point of sale terminal in some embodiments) may communicate with FSP system 130 over network 140, or payment processing network 145, to authorize the purchase. Computing system 200 implemented as part of merchant system 120 may facilitate the transmission and receipt of transaction information and authorization to and from financial service provider system 130.

Figure 3:
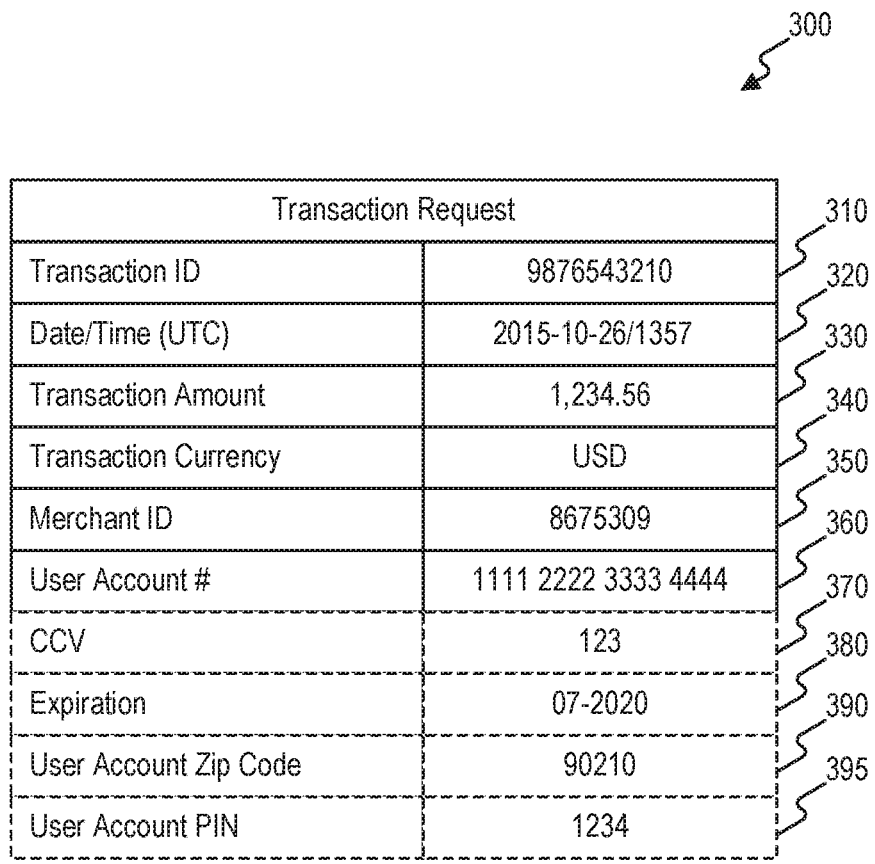
FIG. 3 is an example transaction request, consistent with disclosed embodiments.

FIG. 3 is an example transaction request 300, consistent with disclosed embodiments. Transaction request 300 may include fields that describe the transaction and fields that describe the payment method. In some embodiments, fields that describe the transaction may include a transaction identifier field 310, a timestamp 320, a transaction amount field 330, a transaction currency field 340, and a merchant identifier field 350. Transaction identifier field 310 may include a sequence identifying the transaction. For example, transaction identifier field 310 may include a numeric or alphanumeric sequence, such as a ten-digit number as shown in FIG. 3. Timestamp 320 may include a date (e.g., month, date, and/or year) and time (e.g., hours, minutes, seconds, and/or milliseconds). For example, timestamp 320 may include a numerical representation of the date, such as year-month-date (as shown Oct. 26, 2015), and a numerical representation of the time (as shown 13:57 UTC, or 1:57 PM UTC). In other examples, timestamp 320 may include a time zone code and a non-UTC time (e.g., 9:57 AM EST). Transaction amount field 330 may include the amount of currency request in the transaction. For example, transaction amount field 330 may include the amount of whole currency (e.g., U.S. dollars, E.U. Euros, Canadian dollars, G.B. pounds, and the like) and fractional currency (e.g., U.S. cents, E.U. eurocents, G.B. pence, and the like). For example, as shown in FIG. 3, transaction amount field 330 includes one thousand, two hundred, thirty-four U.S. dollars and fifty six cents (based on the example transaction currency shown in transaction currency field 340), written as a number with a decimal. Transaction currency field 340 may include a notation indicating the currency of the transaction amount, such as U.S. Dollar (USD), European Euro (EUR), Japanese Yen (JPY), British Pound (GBP), Swiss Franc (CHF), Canadian Dollar (CAD), South African Rand (ZAR), and the like. Other items with shares may be used, such as cryptocurrencies (e.g., Bitcoin, Litecoin, and the like) and commodities (e.g., gold, oil, and the like). Merchant identifier field 350 may include a sequence identifying the merchant transmitting the transaction request. For example, merchant identifier field 310 may include a numeric or alphanumeric sequence, such as a seven-digit number as shown in FIG. 3. In other examples, merchant identifier field 350 may include a description of the merchant (e.g., "The Olde Barber Shoppe") and/or a location of the merchant (e.g., "711 Main Street").

Transaction request 300 may also include fields that describe the payment method. In some embodiments, payment method fields may include an account number field 360, which may include a user account number from which funds should be transferred to the merchant (e.g., the merchant identified in merchant identifier field 350) to complete the transaction. Account number field 360 may include identifiers of example accounts, such as a credit card number, a checking account number and/or a routing number, a debit card number, a bank account number, and the like. For example, account number field 360 may include a 16-digit number (as shown in FIG. 3), a 15-digit number, or any other length number or alphanumeric code that identifies a user account from which funds may be withdrawn.

Some embodiments may include additional fields to describe the payment method. These additional fields may include a credit card verification (CCV) field 370, which may include a three- or four-digit number to validate an account number (e.g., the identifier in account number field 360). Other example fields may include an expiration field 380 (e.g., the year, month, and/or date after which the account is no longer valid), a user account zip code field 390 (e.g., a location identifier of the user to which the account belongs, such as a city, state, country, and/or postal code where a user resides), and/or a user account PIN (personal identification number) field 395 (e.g., a numeric sequence or password set by the user that corresponds to the user account number).

While not explicitly listed, embodiments of the present disclosure may use transaction requests with fields besides those explicitly described for transaction request 300 shown in FIG. 3. Moreover, disclosed embodiments may use fewer fields than those disclosed consistent with the present disclosure.

The following processes are directed to various embodiments for enabling a user 110 to continue use of a payment method on a temporary or restricted basis for a transaction when the payment method has been previously declared unusable. In particular, the processes of some embodiments may implement a temporary or restricted use of a payment method based on a transaction request for an amount of currency corresponding to an authorization request code. The processes of some embodiments may implement a location-based restriction on the use of a payment method. In some embodiments, the authorization request code provided by user 110 may be compared to a location of the transaction as part of a decision whether to authorize the transaction. The following processes may be performed by various aspects and components of system 100 and computing system 200 as is apparent from the disclosure.

Figure 4:
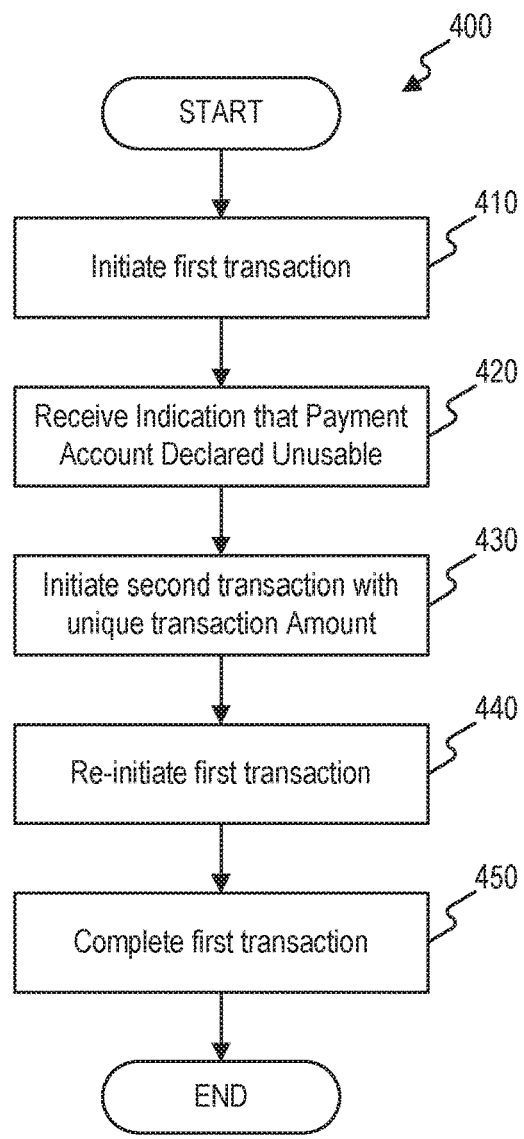
FIG. 4 is a flowchart of an exemplary process for requesting temporary transaction authorization, consistent with the disclosed embodiments.

FIG. 4 is a flowchart of an exemplary process 400 for requesting temporary transaction authorization, consistent with the disclosed embodiments. In the following description, reference is made to certain components of FIG. 1 for purposes of illustration. For example, FIG. 4 may depict process 400 with method steps shown corresponding to one or more of payment card 114, merchant system 120, network 140, payment processing network 145, FSP system 130, database 135, and user device 112. It should be appreciated, however, that other implementations are possible and that components other than those illustrated above in FIG. 1.

At step 410, process 400 may initiate a first transaction. In some embodiments, merchant system 120 may transmit a transaction request to payment processing network 145 and/or FSP system 130. For example, user 110 may present payment card 114 to a merchant and request to purchase an item or service. Merchant system 120 may receive transaction details from the merchant (e.g., the transaction amount and any other purchase details), generate a transaction request (e.g., transaction request 300), and transmit it to payment processing network 145 and/or FSP system 130. In other examples, merchant system 120 may include a self-checkout system, and user 110 may provide payment card 114 and other purchase details to merchant system 120, which may in turn create a transaction request (e.g., transaction request 300) and transmit it to payment processing network 145 and/or FSP system 130.

At step 420, process 400 may receive an indication that payment account is unusable. Merchant system 120 may receive a message from payment processing network 145 and/or FSP system 130 indicating that the transaction request from step 410 has been declined. For example, payment processing network 145 may transmit a message to merchant system 120 stating that the payment cannot be authorized or the account is not usable.

At step 430, process 400 may initiate a second transaction. Merchant system 120 may transmit a transaction request to payment processing network 145 and/or FSP system 130 for a transaction amount corresponding to an authorization request code. For example, user 110 may request that an operator of merchant system 120 charge a particular amount to the user account corresponding to payment card 114, with the particular amount corresponding to an authorization request code. Merchant system 120 may create a transaction request (e.g., transaction request 300) with the authorization request code included in transaction amount field 330. Merchant system 120 may transmit the completed transaction request to payment processing network 145 and/or FSP system 130.

In other examples, in step 430, merchant system 120 may include a self-checkout system, and user 110 may provide payment card 114 and other purchase details to merchant system 120, which may in turn create a transaction request (e.g., transaction request 300) and transmit it to payment processing network 145 and/or FSP system 130. In this example, user 110 may request a charge corresponding to an authorization request code manually or attempt to purchase an item with a value matching the authorization request code.

While FIG. 4 depicts step 410 and step 420 as occurring before step 430, in some embodiments, process 400 may begin with step 430. For example, a user may be aware or suspect that his or her account is locked and, therefore, initiate a transmission request with the transaction amount corresponding to a predetermined authorization request code before attempting to complete a desired transaction.

At step 440, process 400 may re-initiate the first transaction. In some embodiments, merchant system 120 may transmit a transaction request to payment processing network 145 and/or FSP system 130, such as in the manner discussed in step 410. For example, user 110 may present payment card 114 to a merchant and request to purchase an item or service. Merchant system 120 may receive transaction details from the merchant (e.g., the transaction amount and any other purchase details), generate a transaction request (e.g., transaction request 300), and transmit it to payment processing network 145 and/or FSP system 130. In other examples, merchant system 120 may include a self-checkout system, and user 110 may provide payment card 114 and other purchase details to merchant system 120, which may in turn create a transaction request (e.g., transaction request 300) and transmit it to payment processing network 145 and/or FSP system 130.

Although the term "re-initiate" has been used to describe step 440, in certain embodiments, step 440 may be the first time that the user attempts to purchase an item using merchant system 120. For example, process 400 may begin with step 430. In some embodiments, process 400 may require a failed or blocked transaction request or attempted transaction (e.g., step 410 and/or step 420) prior to processing a transaction request with an authorization request code in transaction amount field 330 (e.g., step 430). However, in other embodiments, process 400 may not require a blocked transaction, and process 400 may begin with step 430.

Further, in some embodiments, process 400 may not reinitiate a transaction. For example, process 400 may not include step 440 and step 450. That is, certain embodiments may transmit a transaction request that includes an authorization request code (e.g., step 430) without subsequently completing a transaction (e.g., without step 440 and/or step 450).

At step 450, process 400 may complete the first transaction. Merchant system 120 may receive a message confirming that the transaction request (e.g., transaction request 300) has been processed. For example, payment processing network 145 may send a message to FSP system 130 requesting a funds transfer from a user account. FSP system 130 may confirm and transfer funds from that account. Based on the funds transfer or a funds availability confirmation payment processing network 145 may transmit a message to merchant system 120 indicating that the payment has been processed. When merchant system 120 receives the payment processing confirmation, it may provide an indication (e.g., visual, sound, text, and the like) that the funds transfer has been confirmed. In some embodiments, even though a user's account may be unlocked (e.g., unlocked through step 430), the account may not be able to complete the requested transaction for another reason. For example, even if unlocked, the user account may not have sufficient funds and therefore, step 450 may not be completed.

Figure 5:
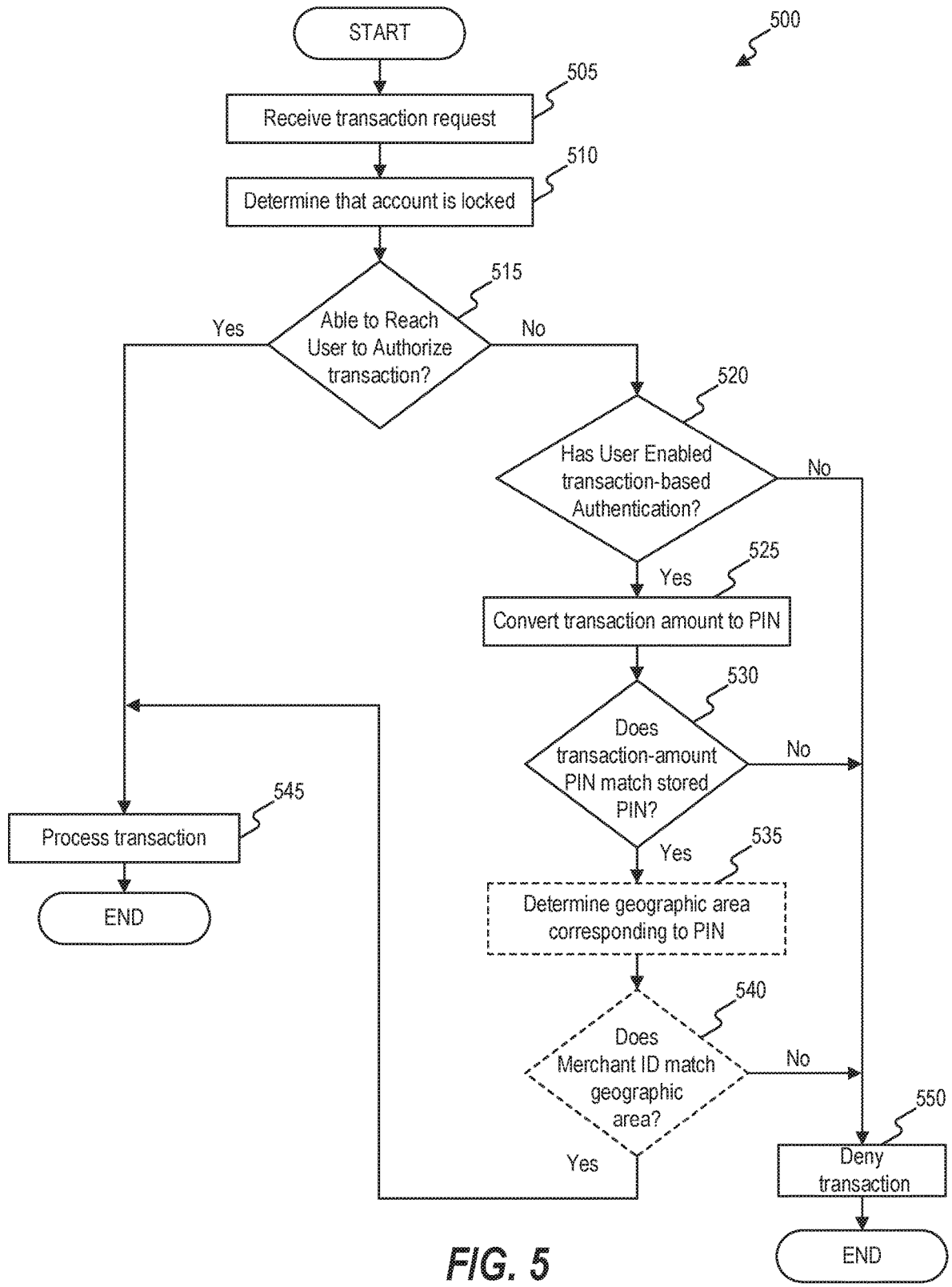
FIG. 5 is a flowchart of an exemplary authorization process for authorizing a transaction, consistent with the disclosed embodiments.

FIG. 5 is a flowchart of an exemplary authorization process 500 for authorizing a transaction, consistent with the disclosed embodiments. In the following description, reference is made to certain components of FIG. 1 for purposes of illustration. For example, FIG. 5 may depict process 500 with method steps shown corresponding to one or more of payment card 114, merchant system 120, network 140, payment processing network 145, FSP system 130, database 135, and user device 112. It should be appreciated, however, that other implementations are possible and that components other than those illustrated above in FIG. 1.

At step 505, process 500 may receive a transaction request. Payment processing network 145 and/or FSP system 130 may receive a transaction request (e.g., transaction request 300) from merchant system 120. For example, merchant system 120 may generate a transaction request, such as transaction request 300, as described in step 410, step 430, and/or step 440 of process 400 in FIG. 4.

At step 510, process 500 may determine that an account is locked. Payment processing network 145 and/or FSP system 130 may determine whether the account included in the transaction request has a hold (e.g., for fraudulent activity). For example, payment processing network 145 may provide the transaction request to FSP system 130. In this example, FSP system 130 may analyze account number field 360 of transaction request 300 to determine the account associated with the transaction request as the source of funds for the proposed transaction. FSP system 130 may query one or more databases (e.g., database 135) to determine the status of the account identified in account number field 360. Database 135 may return a status, such as disabled, hold, potential fraudulent activity detected, and the like.

At step 515, process 500 may determine whether a user is reachable to authorize the transaction. In some embodiments, FSP system 130 and/or payment processing network 145 may attempt to contact user 110 to inquire about the transaction request. For example, payment processing network 145 may query FSP system 130 to determine the state of the account (e.g., account number field 360). FSP system 130 may utilize one or more databases (e.g., database 135) to determine the state of the account. When FSP system 130 determines that there is a hold on the account, FSP system 130 may attempt to reach user 110. For example, FSP system 130 may query to determine ways to reach user 110, such as an automated telephone call to user 110, a text message sent to user 110, or a message through a mobile application running on a mobile device of user 110. The message to user 110 may include a description of the transaction and a question whether user 110 initiated the transaction. The message may solicit a response from user 110, such as a touch-tone or spoken response on a telephone, a reply to a text message, or a confirmation selection within a mobile application. FSP system 130 may analyze the response to determine whether to process the transaction request.

Regardless of the message and solicitation, in some embodiments, user 110 may not respond or be able to respond to the inquiry from FSP system 130. For example, user 110 may not have access to a telephone or user device 112. In other examples, user 110 may have access to user device 112, but user device 112 may lack a network connection (e.g., to network 140) or be inoperable. In either example, user 110 may not be able to receive a call, text message, or mobile application message.

In some embodiments, system 100 may be able to reach user 110 by telephone, smartphone, or mobile device. For example, FSP system 130 may initiate an automated call to user 110, who may indicate that he or she wishes to proceed with the transaction that prompted the call. If system 100 is able to reach user 110, system 100 may determine whether to allow subsequent purchases (e.g., as discussed with regard to step 545 below) or process the instant transaction. Although not shown in detail in FIG. 5, if system 100 is able to communicate with user 110 through these mechanisms, process 500 may proceed to process the instant transaction request if the user authorizes the transaction. And, also not explicitly shown in FIG. 5, if system 100 receives input from user 110 indicating that he or she did not make the transaction in question, system 100 will deny the transaction and may maintain a block on the account.

In some embodiments, process 500 may omit step 515 and proceed to step 520. For example, process 500 may not attempt to reach a customer by telephone, text message, or smartphone application and, instead, may proceed from step 510 to step 520 without using intermittent ways to reach the user to verify the transaction.

When process 500 is not able to reach the user (e.g., step 515, "no"), process 500 may proceed to step 520. At step 520, process 500 may determine whether the account has enabled transaction-based authentication. FSP system 130 may query database 135 to determine whether the account referenced in the transaction request (e.g., account number field 360) has enabled transaction-based account authorization, including an associated authorization request code. For example, before process 500 begins, user 110 may opt-in to use the features described in this disclosure, such as process 400, process 500, and/or process 600. FSP system 130 may annotate the user account to note that user 110 has enabled these authorization processes for his or her account. For example, FSP system 130 may change a Boolean value in a user account to true and store an authorization request code.

When process 500 determines that the user has enabled transaction-based authentication (e.g., step 520, "yes"), process 500 may proceed to step 525. At step 525, process 500 may convert transaction amount field 330 to an authorization request code (also referred to as a "personal identification code" or a "PIN" (as shown in FIG. 5), which may be a different value than that stored in PIN field 395 in embodiments where transaction request 300 includes PIN field 395). In some embodiments, system 100 may convert transaction amount field 330 to an authorization request code by truncating the decimal (or "cents") of the transaction amount to form a whole number. For example, FSP system 130 may determine that transaction amount field 330 contains a value of "1,987.11" and truncate that value to convert the field value to be a transaction authorization code of "1987." In some embodiments, system 100 may convert transaction amount field 330 to an authorization request code by rounding the value of the transaction amount to the nearest whole number. For example, FSP system 130 may determine that transaction amount field 330 contains a value of "1,987.50" and round that value to convert the field value to be a transaction authorization code of "1988." In another example, FSP system 130 may round a value of "1,987.49" to form a transaction authorization code of "1987." As a further example, FSP system 130 may round a value of "1,987.88" to form a transaction authorization code of "1988." In some embodiments, system 100 may convert transaction amount field 330 to an authorization request code by multiplying the value of the transaction amount by 100 to form a whole number. For example, FSP system 130 may determine that transaction amount field 330 contains a value of "1,987.50" and multiply that value by 100 to convert the field value to be a transaction authorization code of "198750." While examples have used transaction amount values in the thousands to form four-digit and six-digit example transaction authorization codes, disclosed embodiments may use transaction authorization codes of fewer or greater digits (e.g., two, three, five, eight, ten digits). And hence, disclosed embodiments may receive transaction requests with transaction amount field values of greater or lesser amounts of currency.

In some embodiments, system 100 may use the transaction amount value as the authorization request code without performing any arithmetic functions on the value. FSP system 130 may receive transaction request 300, identify transaction amount field 330, and determine the value of that field to be the authorization request code. For example, FSP system 130 may determine that transaction amount field 330 contains a value of "1,987.50" and determine the transaction authorization code to be "1987.50." While commas are used in this and other example transaction amount values, they are included as is customary for accounting and financial formatting. However, in other examples the transaction amount value (e.g., transaction amount field 330) may not include commas for every three digits.

At step 530, process 500 may determine whether the authorization request code matches a predetermined code (both codes also referred to as a "personal identification code" or "PIN," as shown in FIG. 5, which may have a value distinct from PIN field 595 in embodiments where transaction request 300 includes PIN field 395). FSP system 130 may compare the transaction authorization code generated in step 525 to a stored code associated with the user account to verify that they match. In some embodiments, system 100 may perform a hash function on the authorization request code. For example, in order to avoid storing the plain text of the authorization request code, FSP system 130 may store the result of the hashed authorization request code for verification purposes. When verifying the authorization request code, FSP system 130 may perform the same one-way hash function on the received authorization request code and determine if the hashed result matches the stored hash value.

When process 500 determines that the authorization request code matches a predetermined authorization code (e.g., step 530, "yes"), process 500 may proceed to step 525. At step 535, process 500 may determine a geographic area corresponding to the authorization request code. In some embodiments, an authorization request code may correspond to a specific geographic area. For example, user 110 may notify FSP system 130 that he or she plans to travel to Europe. FSP system 130 may provide user 110 with an authorization request code that, when provided, provides account authorization (at least temporarily) to process transactions originating from merchants located in Europe. Therefore, system 100 may permit transactions in areas where the user is physically present while continuing to block or disable a user account for transaction requests sent by merchants from areas where the user is not present (e.g., Australia in this example). The geographic region may correspond to a geopolitical boundary, such as one or more continents, countries, states, counties, cities. In other examples, the geographic region may correspond to a region defined by GPS coordinates. In still other examples, the region may correspond to a venue or attraction (e.g., Walt Disney World, Capital One Arena, Olympic Park).

In some embodiments, FSP system 130 may receive authorization request codes and their corresponding geographic area from user 110. For example, a computing device may receive a four-digit number and a location from user 110. The computing device may transmit the number and location pair to FSP system 130, which may in turn associate the number and location with a user profile and store it in a database (e.g., database 135).

In other embodiments, FSP system 130 may generate authorization request codes and determine their associated geographic areas. For example, FSP system 130 may receive travel plans of a user and generate one or more authorization request codes corresponding to different geographic areas matching the travel plans.

In some embodiments, process 500 may omit step 535 and/or 540. For example, as shown in FIG. 5, step 535 and step 540 appear in dashed lines indicating that they may be optional steps. For example, system 100 may not include geographic restrictions when verifying an authorization request code. In other examples, process 500 may omit step 535 and/or step 540 when system 100 is unable to determine the geographic location from which transaction request 300 originates. For example, system 100 may not be able to correlate merchant identifier 350 with a geographic location.

At step 540, process 500 may determine whether a merchant identifier matches a geographic area corresponding to the transaction-amount-based code. FSP system 130 may analyze the transaction request to identify the source of the request. For example, FSP system 130 may analyze the merchant identifier field 350 to determine the location. In an embodiment, FSP system 130 may access a database that maps merchant identifiers (e.g., merchant identifier field 350) to their corresponding location (e.g., city, state, country, GPS coordinates, and the like). FSP system 130 may compare the location of the merchant identifier to the authorization region of the authorization request code. For example, FSP system 130 may determine that the merchant identifier of "133483928" corresponds to a café located in Rome, Italy, and that the authorization request code of "1243.55" corresponds to request authorization for transactions originating from continental Europe.

When process 500 determines that the merchant identifier matches a geographic region associated with the authorization code (e.g., step 540, "yes") or when process 500 is able to reach the user to authorize the transaction (e.g., step 515, "yes"), process 500 may proceed to step 545. At step 545, process 500 may enable the account to process subsequent transactions. For example, FSP system 130 may edit a database entry (e.g., database 135) corresponding to a user account (e.g., the account identified in account number field 360) to note that subsequent transaction request for funds from the account should be processed.

In some embodiments, system 100 may enable account use for a given period of time. FSP system 130 may edit a database entry to allow purchases involving a user account for a predetermined time period. For example, FSP system 130 may add a rule indicating that transaction request 300 for the account should be processed if received in the next 15 minutes, 30 minutes, one hour, two hours, four hours six hours, twelve hours, one day, one week, one month, and the like. In some embodiments, FSP system 130 may enable use of an account so long as a transaction requests occurs within a predetermined time period from an earlier transaction request. For example, FSP system 130 may allow a transaction so long as it occurs within an hour of the initial authorization request code transmission and then allow subsequent transactions so long as each transaction occurs within twelve hours of the previous transaction. This example time restriction may allow a user to continue to use one's account without re-authorization while traveling when the trip is for an uncertain amount of time, while still re-implementing a hold on the account (e.g., to prevent fraudulent activity) when the user travels home or stops using the account.

In some embodiments, system 100 may enable account use for a predetermined geographic region. FSP system 130 may enable the account only for transaction requests originating from a predefined area. For example, a transaction authorization code may correspond to a predetermined region as discussed with regard to step 535 and step 540. FSP system 130 may allow transaction request 300 for the user account when transaction request 300 includes a merchant identifier (e.g., merchant identifier field 350) that corresponds to a merchant located within the predetermined region. In other examples, FSP system 130 may determine the originating point of transaction request 300 within network 140. For example, FSP system 130 may determine the IP address, MAC address, or other characteristics of transaction request 300 when it is transmitted over a packetswitched network. FSP system 130 may use those characteristics to determine a location of merchant system 120 within network 140 and/or within a geographic region.

Some embodiments may combine the transaction rules or restrictions described above. For example, system 100 may enable account use for a predetermined amount of time but only within a given geographic region. In this example, FSP system 130 may enable account access for transaction originating from the United Kingdom for a period of ten days.

Process 500 may reach step 550 through a variety of steps (e.g., step 520, "no;" step 530, "no;" step 540, "no"). In these example instances, process 500 may proceed to step 550. At step 550, process 500 may deny the transaction. For example, FSP system 130 and/or payment processing network 145 may transmit a message to merchant system 120 indicating that the transaction cannot be completed. And, FSP system 130 may maintain the disabled status of the account in question. In some embodiments, after a predetermined number of failed attempted transactions, system 100 may disable transaction-based authentication. For example, FSP system 130 may modify the user account profile so that additional attempts, even if correctly matching a transaction authorization code, will be denied. In this example, step 520 may result in a determination of "no."

While FIG. 5 depicts process 500 with steps in a particular order, in some embodiments process 500 may omit certain steps or perform them in a different order than depicted. For example, in some embodiments, geographic verification (e.g., step 535 and/or step 540) may be omitted. In other examples, process 500 may not attempt to reach the user via telephone (e.g., step 515 may be omitted). In still further example embodiments, the order of the steps of process 500 may change from that depicted in FIG. 5. For example, in some embodiments, process 500 may attempt to reach user 110 by telephone (e.g., step 515) after verifying that the transaction request includes an authorization request code (e.g., step 530). Other embodiments may present the steps in other orders consistent with this disclosure.

Figure 6:
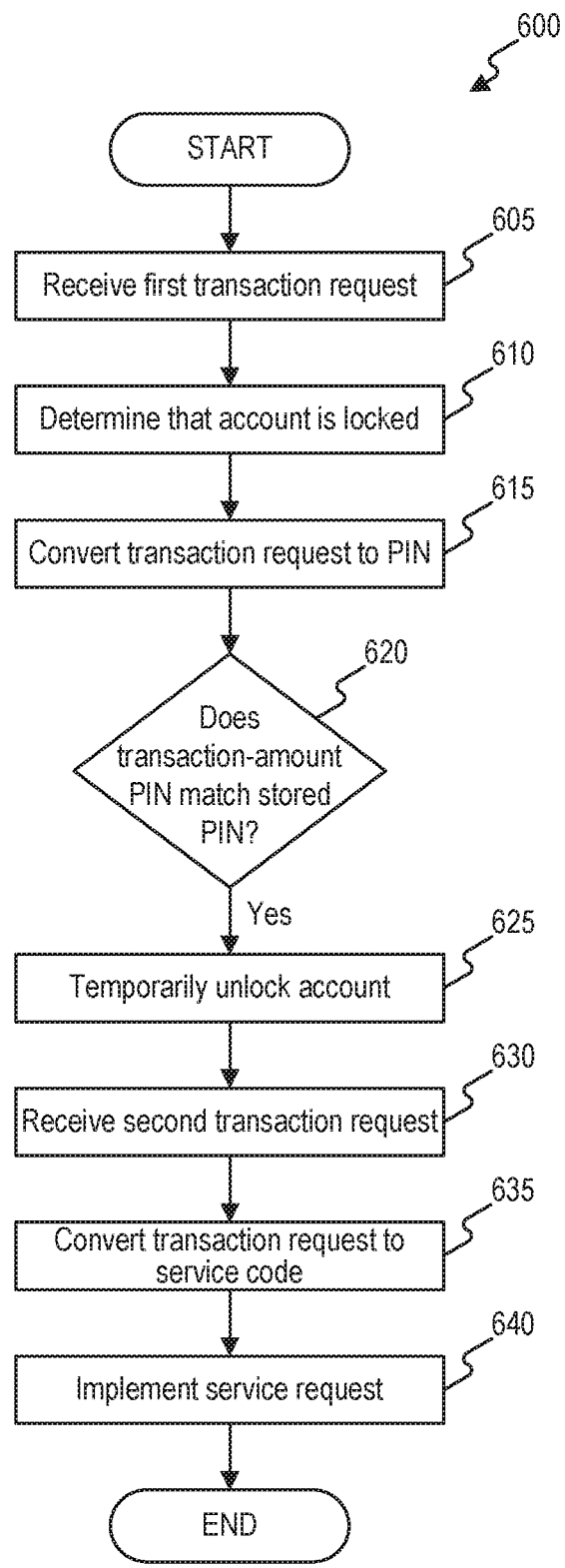
FIG. 6 is a flowchart of an exemplary authorization process for authorizing a transaction, consistent with the disclosed embodiments.

FIG. 6 is a flowchart of an exemplary authorization process 600 for authorizing a transaction, consistent with the disclosed embodiments. In the following description, reference is made to certain components of FIG. 1 for purposes of illustration. For example, FIG. 6 depicts process 600 with method steps shown corresponding to one or more of payment card 114, merchant system 120, network 140, payment processing network 145, FSP system 130, database 135, and user device 112. It should be appreciated, however, that other implementations are possible and that components other than those illustrated above in FIG. 1.

At step 605, process 600 may receive a first transaction request. Payment processing network 145 and/or FSP system 130 may receive transaction request 300 from merchant system 120. For example, system 100 may receive transaction request 300 as described in step 505 of process 500.

At step 610, process 600 may determine that an account is locked. Payment processing network 145 and/or FSP system 130 may determine that account number field 360 of transaction request 300 corresponds to an account that is disable (e.g., because of suspected fraudulent activity). For example, system 100 may determine that an account is locked as described in step 510 of process 500.

At step 615, process 600 may convert the transaction request into an authorization request code (also referred to as a "personal identification code" or "PIN," as shown in FIG. 6; although, in embodiments where transaction request 300 includes PIN field 393, the authorization request code, even though referred to as a "PIN" in FIG. 5 and FIG. 6, may be distinct from and contain a different value than PIN field 395). FSP system 130 may analyze transaction amount field 330 and convert it to a format of an authorization request code. For example, system 100 may convert the transaction amount to a PIN or other code corresponding to an authorization request code as described in step 525 of process 500. In some embodiments, as discussed in the description of step 525 above, "converting" may include merely extracting the value from transaction amount field 330 without performing any arithmetic operations on that value.

At step 620, process 600 may determine whether the authorization request code of transaction request 300 (also referred to as a "transaction-amount PIN" or "personal identification code") matches a predetermined authorization request code (also referred to as a "stored PIN"). FSP system 130 may determine that the authorization request code generated from account number field 360 of transaction request 300 corresponds to a predetermined authorization request code. For example, system 100 may determine a match between codes as described in step 530 of process 500.

At step 625, process 600 may temporarily unlock the account. FSP system 130 may update a database (e.g., database 135) to permit transaction requests involving a user account. For example, system 100 may enable the account for use or implement rules to permit qualifying transaction requests to be processed as described in step 545 of process 500.

In some embodiments, unlocking the account may permit a user to use transaction requests (e.g., transaction request 300) to transmit service requests to FSP system 130. Rather than sending an authorization request code to activate one's disabled account, a user may transmit a service request code in transaction amount field 330 to make a service request with FSP system 130 as described in step 630, step 635, and step 640.

At step 630, process 600 may receive a second transaction request. Payment processing network 145 and/or FSP system 130 may receive transaction request 300 from merchant system 120. For example, system 100 may receive transaction request 300 as described in step 505 of process 500 and/or step 605 of process 600.

While referred to as a "second transaction request," in some embodiments, process 600 may begin with step 630. Step 630 may involve the first transaction request received in process 600. For example, FSP system 130 may process service request codes from transaction requests after an account has been previously enabled. This example enabling may occur using process 500 or a separate process, such as the user operating a web application associated with FSP system 130. In still further examples, FSP system may process service request codes (e.g., as described below in step 635 and step 640) when a user's account is in a disabled or locked state.

At step 635, process 600 may convert transaction request 300 into a service code. FSP system 130 may analyze transaction amount field 330 and convert it to a format of a service request code. For example, system 100 may convert the transaction amount to a code corresponding to service request. This conversion step may follow the same conversions described in relation to converting authorization request codes (e.g., in step 525 of process 500, in step 615 of process 600). However, rather than being a code to request authorization of further transaction requests, the code may request that FSP system 130 perform a service function involving a user's account. For example, service request codes may correspond to predetermined functions, such as requesting authorization for foreign transactions, requesting a credit limit increase to a user's account (in this example, the account has a credit limit), requesting a new card for one's account, and/or cancelling a request for a new card. Although not explicitly enumerated here, still other known service request functions may be implemented using the disclosed techniques.

In some embodiments, as discussed in the description of step 525 and step 615 above, "converting" may include merely extracting the value from transaction amount field 330. For example, FSP system 130 may not perform any arithmetic operations on the value in transaction amount field 330.

System 100 may determine the specific service request to which the service request code corresponds. For example, FSP system 130 may access a database that includes a service request look-up table based on a given service request code. For example, FSP system 130 may submit a query including a service request code value (e.g., "1000.01") and determine the associated service request (e.g., "authorize foreign transactions").

At step 640, process 600 may implement the service request. FSP system 130 may modify the user account commensurate with the service request. In the example of a service request to cancel a new card request, FSP system 130 may query a database to determine whether a new card request exists for the account and, if one does, update the database to note that the new card should not be issued. In the example of a service request to increase a credit limit, FSP system 130 may determine whether the account is eligible for a credit limit increase and, if so, it may update the account to modify the credit limit to be a higher amount. Although not explicitly enumerated here, FSP system 130 may implement other service requests received through service request codes commensurate with this disclosure.

Figure 7A:
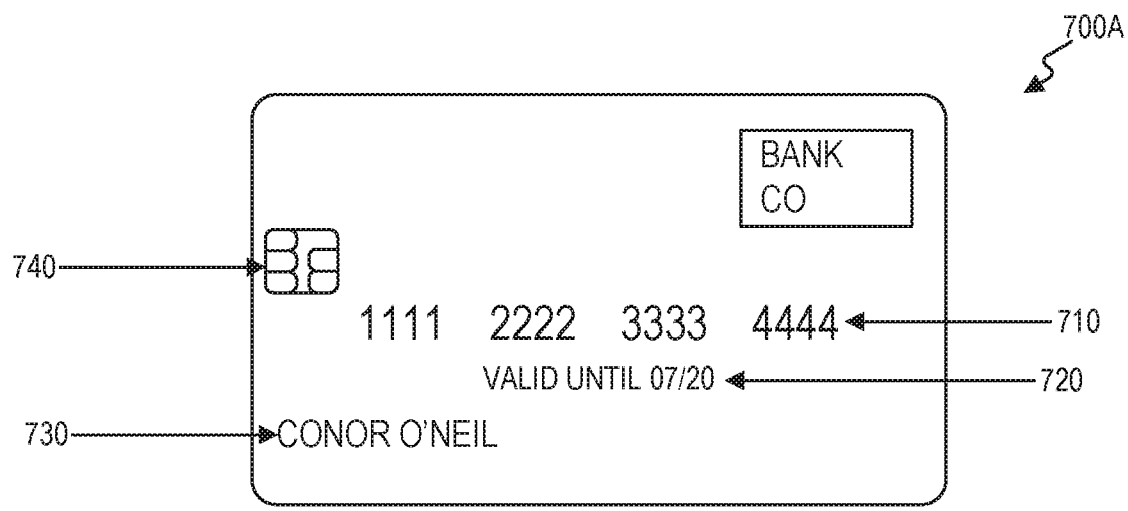
FIGS. 7A and 7B are examples of a user device for requesting temporary transaction authorization, consistent with the disclosed embodiments.
Figure 7B:
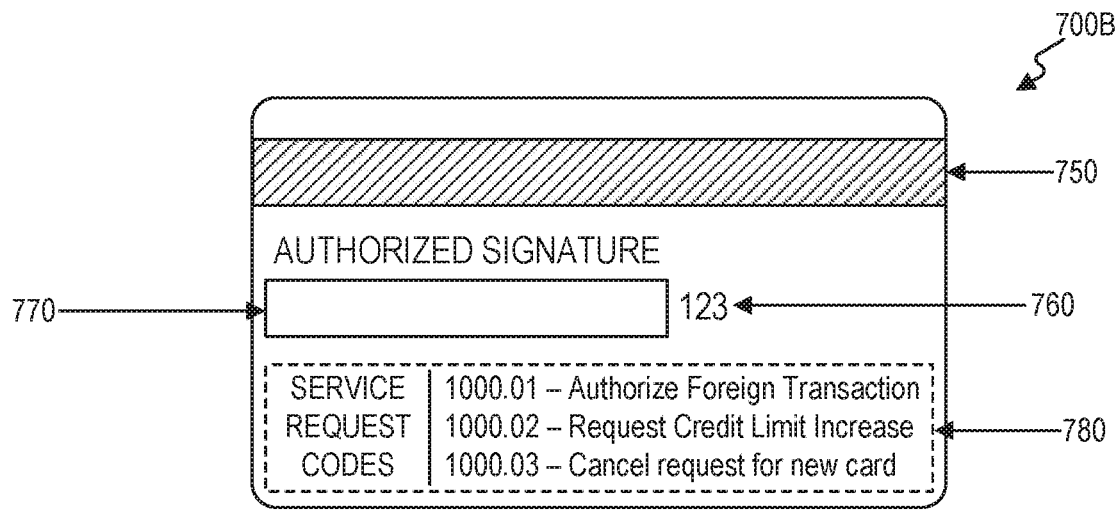

FIGS. 7A and 7B are examples of a user device for requesting temporary transaction authorization, consistent with the disclosed embodiments. FIG. 7A depicts a front face 700A of an example account card consistent with disclosed embodiments. As shown, front face 700A may include an account number 710 (e.g., which may be the same number as used in account number field 360 in a transaction request using this card), an expiration date 720 (e.g., which may be the same value as that used in expiration field 380), an account holder name 730, and security chip 740. Although not shown in FIG. 3, transaction request 300 may include additional fields to capture the information presented in account holder name 730 and secure chip 740. Front face 700A may include other features, such as those used in existing and future debit and credit cards.

FIG. 7B depicts a rear face 700B of an example account card consistent with disclosed embodiments. As shown, rear face 700B may include a magnetic strip 750, a credit card verification (CCV) code 760 (e.g., which may be the same value as that used in CCV field 370), and an account holder signature field 770. In some embodiments rear face 700B may include a list of service request codes and the corresponding service request function in a service request information region 780. For example, as shown, service request information region 780 may include a description of available service requests and the transaction amount used to implement the service request (e.g., the transaction amount of the transaction request used in step 630, step 635, and step 640). Although not shown, service request information region 780 may include alternative or additional service requests and their corresponding transaction amounts. In some embodiments, a user or a financial institution may customize the codes shown in service request information region 780, for example, to include the most used codes or most likely to be used codes for a specific user.

The above described processes may be implemented as a computer program or application or as a plugin module or sub component of another application. Some of the described processes may be executed by computing system 200 of FSP system 130, merchant system 120, user device 112 or other system provided as part of payment processing network 145. The described techniques may be varied and are not limited to the examples or descriptions provided.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity performing the transaction authorization methods, it is to be understood that consistent with disclosed embodiments another entity provided as part of payment processing network 145, for example, may provide such services in conjunction with or separate from a financial service provider. In some embodiments, a financial service provider may provide the disclosed account information, location information and transaction rules as part of a database accessible to payment processing network 145.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A system for temporarily enabling an otherwise disabled payment account for use in a transaction, the system comprising:
    one or more memory devices storing instructions; and
    one or more processors configured to execute the instructions to perform operations comprising:
        receiving, from a point of sale device, a transaction request associated with an account of a user, the transaction request comprising a transaction value representing a currency amount;
        determining that the user account has a disabled status;
        converting the transaction request into a personal identification code based at least in part on the transaction value;

determining that the personal identification code matches a stored authorization code associated with the user account;
based on the determination that the personal identification code matches the stored authorization code associated with the user account, modifying the disabled status to permit successful processing of at least one subsequent transaction request associated with the user account;
receiving, from the point of sale device, the at least one subsequent transaction request, the at least one subsequent transaction request comprising a subsequent transaction value representing a currency amount;
converting the at least one subsequent transaction request into a service request code based at least in part on the subsequent transaction value;
determining an associated service request based on the service request code and a predetermined look-up table, the look-up table being specific to a geographic region determined by geographical data in the at least one subsequent transaction request; and
authorizing the associated service request.

2. The system of claim 1, wherein the operations further comprise:
after determining that the user account has a disabled status, requesting a response from the user; and
determining that no response is received from the user.

3. The system of claim 2, wherein requesting a response from the user comprises performing at least one of placing a call to a phone number associated with the user account; sending a notification to a mobile application associated with the user account; or sending an electronic message to an email address associated with the user account.

4. The system of claim 1, wherein: converting the transaction request into a personal identification code comprises modifying the transaction value to be a whole number.

5. The system of claim 1, wherein converting the transaction request into a personal identification code comprises multiplying the transaction value by 100.

6. The system of claim 1, wherein converting the transaction request into a personal identification code comprises rounding up the transaction value to the next highest non-fractional amount.

7. The system of claim 1, wherein
determining that the personal identification code matches the stored authorization code comprises determining a geographic region corresponding to the stored authorization code; and
modifying the disabled status on the user account comprises permitting successful processing of at least one subsequent transaction request, if the at least one subsequent transaction request comprises a merchant identifier corresponding to the determined geographic region.

8. The system of claim 1, wherein:
the transaction request further comprises a merchant identifier;
determining that the personal identification code matches the stored authorization code associated with the user account further comprises determining a geographic region corresponding to the stored authorization code;
the operations further comprise determining a location associated with the merchant identifier; and
modifying the disabled status comprises modifying the disabled status only when the location associated with the merchant identifier is determined to be within the geographic region.

9. The system of claim 1, wherein the transaction request further comprises a personal identification number (PIN) that is distinct from the personal identification code.

10. A computer-implemented method for temporarily enabling an otherwise disabled payment account for use in a transaction, the method comprising:
receiving, from a point of sale device, a transaction request associated with an account of a user, the transaction request comprising a transaction value representing a currency amount;
determining that the user account has a disabled status;
determining that the transaction value matches a stored authorization code associated with the user account;
based on the determination that the transaction value matches the stored authorization code associated with the user account, modifying the disabled status to permit successful processing of at least one subsequent transaction request associated with the user account;
receiving, from the point of sale device, the at least one subsequent transaction request, the at least one subsequent transaction request comprising a subsequent transaction value representing a currency amount;
converting the at least one subsequent transaction request into a service request code based at least in part on the subsequent transaction value;
determining an associated service request based on the service request code and a predetermined look-up table, the look-up table being specific to a geographic region determined by geographical data in the at least one subsequent transaction request; and
authorizing the associated service request.

11. The method of claim 10, wherein the method further comprises:
after determining that the user account has a disabled status, requesting a response from the user; and
determining that no response is received from the user.

12. The method of claim 11, wherein requesting a response from the user comprises performing at least one of placing a call to a phone number associated with the user account; sending a notification to a mobile application associated with the user account; or sending an electronic message to an email address associated with the user account.

13. The method of claim 10, determining that the transaction value matches the stored authorization code comprises modifying the transaction value to be a whole number and determining if the whole number matches the stored authorization code.

14. The method of claim 10, wherein determining that the transaction value matches a stored authorization code comprises multiplying the transaction value by 100 and determining if the multiplied transaction value matches the stored authorization code.

15. The method of claim 10, wherein determining that the transaction value matches a stored authorization code comprises rounding up the transaction value to the next highest non-fractional amount and determining if the rounded transaction value matches the stored authorization code.

16. The method of claim 10, wherein
determining that the personal identification code matches the stored authorization code comprises determining a geographic region corresponding to the stored authorization code; and
modifying the disabled status on the user account comprises permitting successful processing of at least one subsequent transaction request, if the at least one subsequent transaction request comprises a merchant identifier corresponding to the determined geographic region.

17. The method of claim 10, wherein
the transaction request further comprises a merchant identifier; determining that the personal identification code matches the stored
authorization code associated with the user account further comprises determining a geographic region corresponding to the stored authorization code;
the method further comprises determining a location associated with the merchant identifier; and
modifying the disabled status comprises modifying the disabled status only when the location associated with the merchant identifier is determined to be within the geographic region.

18. The method of claim 10, wherein the transaction request further comprises a personal identification number (PIN) that is distinct from the personal identification code.

19. A non-transitory computer-readable medium storing instructions executable by a processor to cause the processor to perform operations for temporarily enabling an otherwise disabled payment account for use in a transaction, the operations comprising:
receiving, from a point of sale device, a transaction request associated with an account of a user, the transaction request comprising a transaction value representing a currency amount;
determining that the user account has a disabled status;
converting the transaction request into a personal identification code based at least in part on the transaction value;
determining that the personal identification code matches a stored authorization code associated with the user account;
based on the determination that the personal identification code matches the stored authorization code associated with the user account, modifying the disabled status to permit successful processing of at least one subsequent transaction request associated with the user account;
receiving, from the point of sale device, the at least one subsequent transaction request, the at least one subsequent transaction request comprising a subsequent transaction value representing a currency amount;
converting the at least one subsequent transaction request into a service request code based at least in part on the subsequent transaction value;
determining an associated service request based on the service request code and a predetermined look-up table, the look-up table being specific to a geographic region determined by geographical data in the at least one subsequent transaction request; and
authorizing the associated service request.

* * * * *